United States Patent
Lee et al.

(10) Patent No.: US 8,013,915 B2
(45) Date of Patent: *Sep. 6, 2011

(54) ANTI-ECLIPSING CIRCUIT FOR IMAGE SENSORS

(75) Inventors: Ji Soo Lee, Boise, ID (US); Richard Johnson, Meridian, ID (US); Joey Shah, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 182 days.

This patent is subject to a terminal disclaimer.

(21) Appl. No.: 12/343,304

(22) Filed: Dec. 23, 2008

(65) Prior Publication Data

US 2009/0141145 A1 Jun. 4, 2009

Related U.S. Application Data

(62) Division of application No. 10/928,324, filed on Aug. 30, 2004, now Pat. No. 7,477,298.

(51) Int. Cl.
*H04N 5/217* (2011.01)
*H04N 3/14* (2006.01)
*H04N 5/335* (2011.01)

(52) U.S. Cl. .................... 348/241; 348/308; 250/208.1

(58) Field of Classification Search ............... 348/230.1, 348/241, 246, 307
See application file for complete search history.

(56) References Cited

U.S. PATENT DOCUMENTS

| | | | |
|---|---|---|---|
| 5,521,639 A * | 5/1996 | Tomura et al. ............... 348/243 |
| 6,072,359 A | 6/2000 | Brambilla et al. |
| 6,377,297 B1 | 4/2002 | Janko et al. |
| 6,414,292 B1 * | 7/2002 | Afghahi ................... 250/208.1 |
| 7,170,556 B2 * | 1/2007 | Kokubun et al. ............. 348/241 |
| 2004/0012696 A1 * | 1/2004 | Teratani et al. ............... 348/246 |
| 2004/0075759 A1 * | 4/2004 | Sato et al. .................... 348/246 |
| 2005/0231398 A1 * | 10/2005 | Ravinuthula et al. .......... 341/50 |

* cited by examiner

*Primary Examiner* — Sinh Tran
*Assistant Examiner* — Christopher K Peterson
(74) *Attorney, Agent, or Firm* — Dickstein Shapiro LLP

(57) ABSTRACT

An anti-eclipse circuit of an image pixel includes a clamping circuit for pulling up a voltage of a reset signal output by the pixel and an eclipse detection circuit for controllably coupling the clamping circuit output to the output of the pixel. The clamping circuit includes a source follower transistor and a switching transistor. The eclipse detection circuit includes a comparator that is operated to detect an eclipse condition. The eclipse detection circuit outputs a control signal to cause the switching transistor to conduct only when a eclipse condition is detected while the pixel is outputting a reset signal.

23 Claims, 9 Drawing Sheets

ANTI-ECLIPSING CIRCUIT FOR IMAGE SENSORS

CROSS REFERENCE TO RELATED APPLICATIONS

The present application is a divisional of U.S. patent application Ser. No. 10/928,324, filed on Aug. 30, 2004, now U.S. Pat. No. 7,477,298 the disclosure of which is incorporated by reference in its entirety.

FIELD OF INVENTION

The present invention relates generally to pixel architectures for semiconductor imagers. More specifically, the present invention relates to an anti-eclipsing circuit for image sensors.

BACKGROUND OF THE INVENTION

FIG. 1 is an illustration of a conventional four transistor (4T) pixel 100 and an associated load circuit 120. The pixel 100 includes a light sensitive element 101, shown as a photodiode, a floating diffusion node C, and four transistors: a transfer transistor 111, a reset transistor 112, a first source follower transistor 113, and a row select transistor 114. The pixel 100 accepts a TX control signal for controlling the conductivity of the transfer transistor 111, a RST control signal for controlling the conductivity of the reset transistor 112, and a ROW control signal for controlling the conductivity of the row select transistor 114. The voltage at the floating diffusion node C controls the conductivity of the first source follower transistor 113. The output of the source follow transistor is presented to the load circuit 120 through the row select transistor 114, which outputs a pixel signal at node B, when the row select transistor 114 is conducting.

The states of the transfer and reset transistors 111, 112 determine whether the floating diffusion node C is coupled to the light sensitive element 101 for receiving a photo generated charge as generated by the light sensitive element 101 during a charge integration period, or a source of pixel power VAAPIX at node A during a reset period.

The pixel 100 is operated as follows. The ROW control signal is asserted to cause the row select transistor 114 to conduct. At the same time, the RST control signal is asserted while the TX control signal is not asserted. This couples the floating diffusion node C to the pixel power VAAPIX at node A, and resets the voltage at node C to the pixel power VAAPIX. The pixel 100 outputs a reset signal Vrst to the load circuit 120. The load circuit 120 contains a load transistor 121, which is biased to a predetermined level VLN. Node B is coupled between the row select transistor 114 and the load transistor 121 and serves as an input to a sample and hold circuit which samples and holds the pixel reset voltage Vrst.

After the reset signal Vrst has been output, the RST control signal is deasserted. The light sensitive element 101 is exposed to incident light and accumulates charges on the level of the incident light during a charge integration period. After the charge integration period, the TX control signal is asserted. This couples the floating diffusion node C to the light sensitive element 101. Charge flows through the transfer transistor 111 and diminishes the voltage at the floating diffusion node C. The pixel 100 outputs a photo signal Vsig to the load circuit 120 which appears at node B and is sampled by the sample and hold circuit. The reset and photo signals Vrst, Vsig are different components of the overall pixel output (i.e., Voutput=Vrst−Vsig).

FIG. 2 is an illustration of an imager 200 that includes a plurality of pixels 100, 100' forming a pixel array 201. The pixel array 201 includes an outer region 201a of barrier pixels 100' and an inner region 201b of image pixels 100. Barrier pixels 100' are similar to the image pixels 100, except they do not produce output signals that are processed by the imager. Barrier pixels 100' improves the noise characteristics of the imager 200.

The imager 200 also includes row circuitry 210, column circuitry 220, an analog-to-digital converter 230, a digital processing circuit 240, and a storage device 250 for output. The imager 200 also includes a controller 260. The row circuitry 210 selects a row of pixels 100, 100' from the pixel array 201. The pixels 100 in the selected row output their reset and pixel signals Vrst, Vsig to the column circuitry 220, which samples and holds the reset and pixel signals Vrst, Vsig. The column circuitry 220 also forms the pixel output (Vrst−Vsig), which is presented to the analog-to-digital converter 230 that converts the difference signal to a digital value. The digital value is then processed by the digital processing circuit 240, which stores the processed value in the storage device 250 for output. The controller 260 is coupled to the pixel array 201, row circuitry 210, column circuitry 220, digital processing circuit 240, and storage device 250, and provides control signals to perform the above described processing.

The pixel 100 is susceptible to a type of distortion known as eclipsing. That is, the pixel 100 outputs reset and photo signals Vrst, Vsig corresponding to a dark pixel when bright light is incident upon the pixel. Eclipsing can occur when very bright light is incident upon the pixel, which causes the light sensitive element 101 to produce a large amount of photogenerated charge. During the time when the pixel 100 is outputting the reset signal, the collected large charge at the light sensitive element 101 may spill over from the light sensitive element 101 to the floating diffusion node C, even when the transfer transistor 111 is off, which diminishes the voltage at node C. During the time when the pixel 100 is outputting a reset signal, the reverse biased PN junction at the floating diffusion node C also acts like a photodiode by collecting photo-generated excess carriers. This effect also diminishes the voltage at node C. The diminished voltage causes the pixel to output an incorrect (i.e., diminished voltage) reset signal Vrst; thereby causing the reset and photo signals Vrst, Vsig to be nearly the same voltage (for example, the photo and reset signals Vrst, Vsig may each be approximately 0 volts). The pixel output (Vrst−Vsig) therefore becomes approximately 0 volts, which corresponds to a voltage normally associated with a dark pixel.

FIG. 3 is an illustration of the pixel 100, its load circuit 120, and a proposed anti-eclipsing circuit 130 for overcoming this problem. The anti-eclipsing circuit 130 comprises a second source follower transistor 131 coupled in series with a switching transistor 132. The output of the switching transistor 132 is coupled in parallel with the output of the pixel 100 to the input of the load circuit 120 (i.e., to node B). The second source follower transistor 131 has one source/drain coupled to the pixel power VAAPIX. The second source follower transistor 131 is biased with a VREF control signal. The conductivity of the switching transistor 132 is controlled by a SHR control signal, which is the asserted when the column circuitry 220 (FIG. 2) of the imager 200 is sampling the reset signal Vrst from the pixel 100. The VREF voltage level is set so that if the voltage on the floating diffusion node C degrades while the reset signal Vrst is being output, the second source follower transistor 131 conducts and pulls the voltage at node B up to VREF minus the threshold voltage of the second source follower transistor 131. One key limitation of the anti-eclipsing circuit 130 relates to subthreshold conduction current flowing through the second source follower transistor 131. Even when anti-eclipsing is not needed, the subthreshold conduction current associated with the second source follower transistor 131 is output to node B as noise in the reset signal Vrst.

Accordingly, there is a need and desire for an improved anti-eclipsing circuit.

SUMMARY OF THE INVENTION

Exemplary embodiments of the method and apparatus of the present invention provide an anti-eclipsing circuit and method of forming same while the circuit comprises a clamping circuit and an eclipse detection circuit. The clamping circuit includes a source follower transistor and a switching transistor. The eclipse detection circuit includes a comparator. The comparator is operated to detect an eclipse condition while the reset signal of a pixel is being sampled. If an eclipse condition is detected, the eclipse detection circuit causes the switching transistor of the clamping circuit to conduct and couple a pull up voltage to the output of the pixel. If no eclipse is detected, the eclipse detection circuit causes the switching transistor to not conduct thereby preventing any subthreshold conduction current associated with the source follower transistor in the clamping circuit from affecting the reset signal. The anti-eclipsing circuit can also be used for other signals being sampled in the imager.

BRIEF DESCRIPTION OF THE DRAWINGS

The foregoing and other advantages and features of the invention will become more apparent from the detailed description of exemplary embodiments of the invention given below with reference to the accompanying drawings, in which.

DETAILED DESCRIPTION OF THE INVENTION

Figure 1:
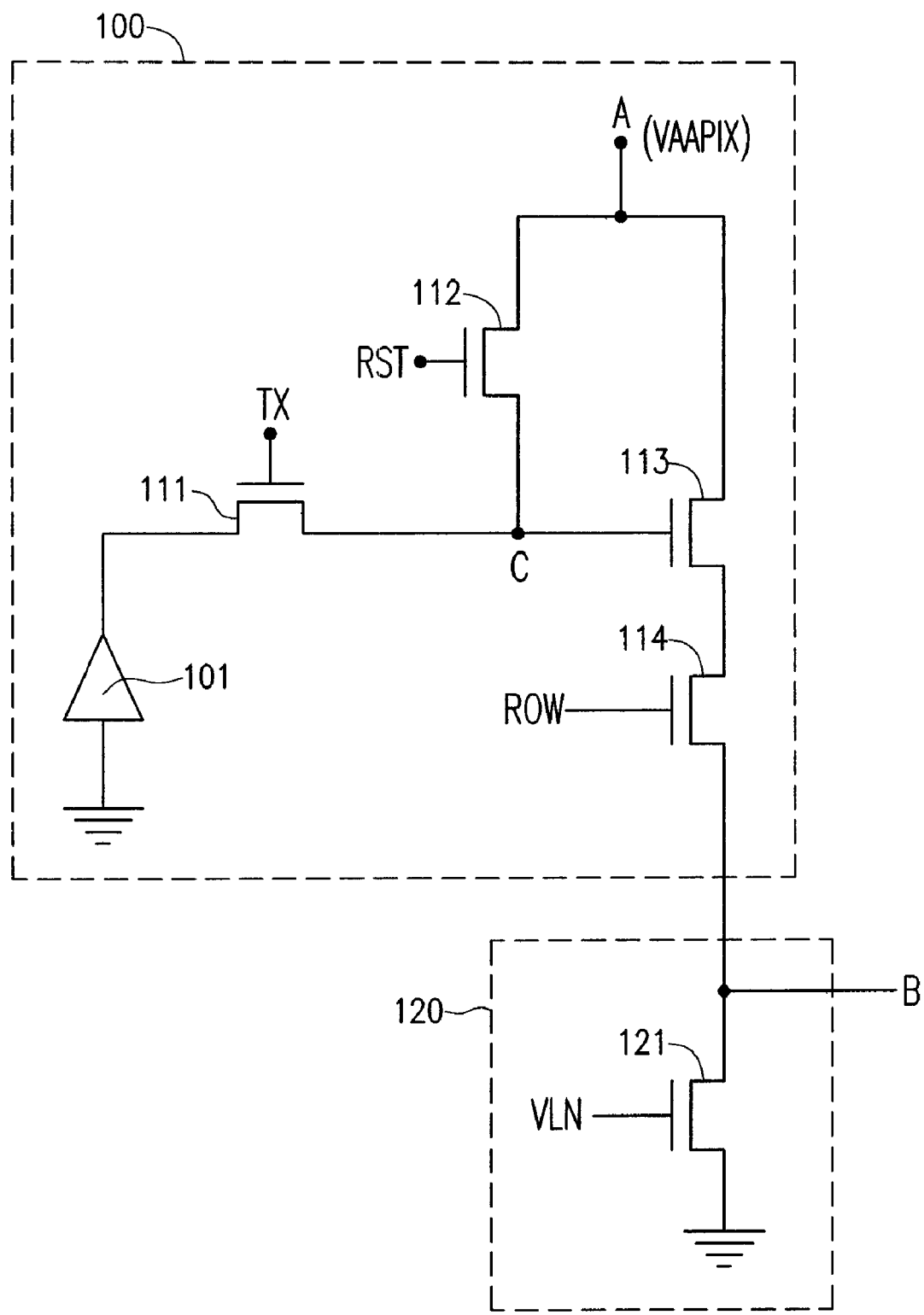
FIG. 1 illustrates a conventional pixel and an associated load circuit.
Figure 4:
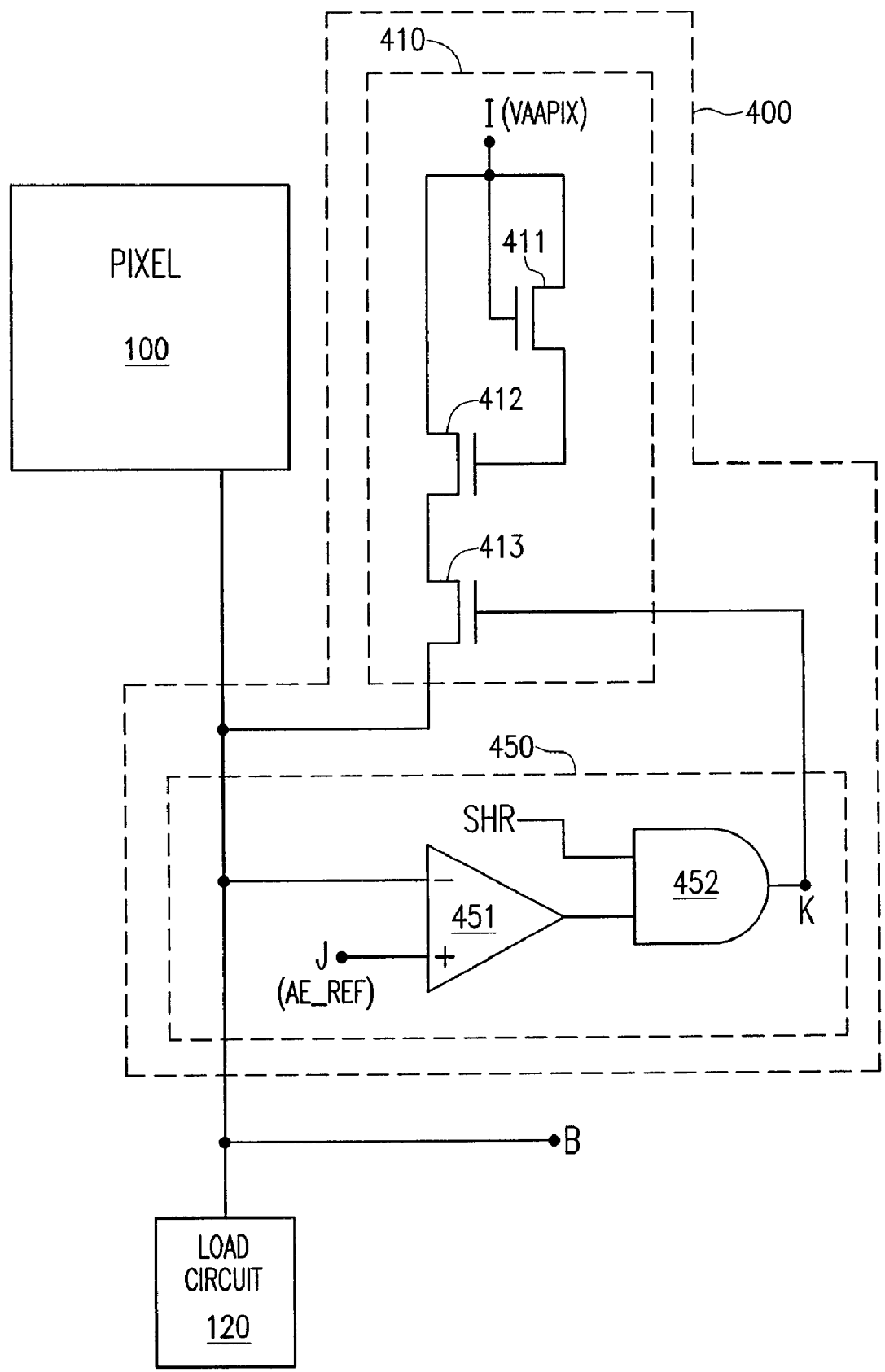
FIG. 4 illustrates one exemplary embodiment of the anti-eclipsing circuit of the present invention.

Now referring to the drawings, where like reference numerals designate like elements, there is shown in FIG. 4 an anti-eclipsing circuit 400 in accordance with one exemplary embodiment of the present invention. The anti-eclipsing circuit 400 of the invention includes a voltage clamping circuit 410 and an eclipse detection circuit 450. A conventional pixel 100, e.g., the 4T circuit of FIG. 1, and a conventional load circuit 120 are also illustrated in FIG. 4.

The voltage clamping circuit 410 comprises three transistors 411, 412, 413. A control transistor 411 has one source/drain and its gate coupled to a node I, which is coupled to receive pixel power VAAPIX. The control transistor 411 acts as a diode and supplies the pixel power VAAPIX to the gate of the source follower transistor 412, which is coupled in series between node I and a switching transistor 413. As described in greater detail below, the gate of the switch transistor 413 receives an output from the eclipse detection circuit 450.

Figure 2:
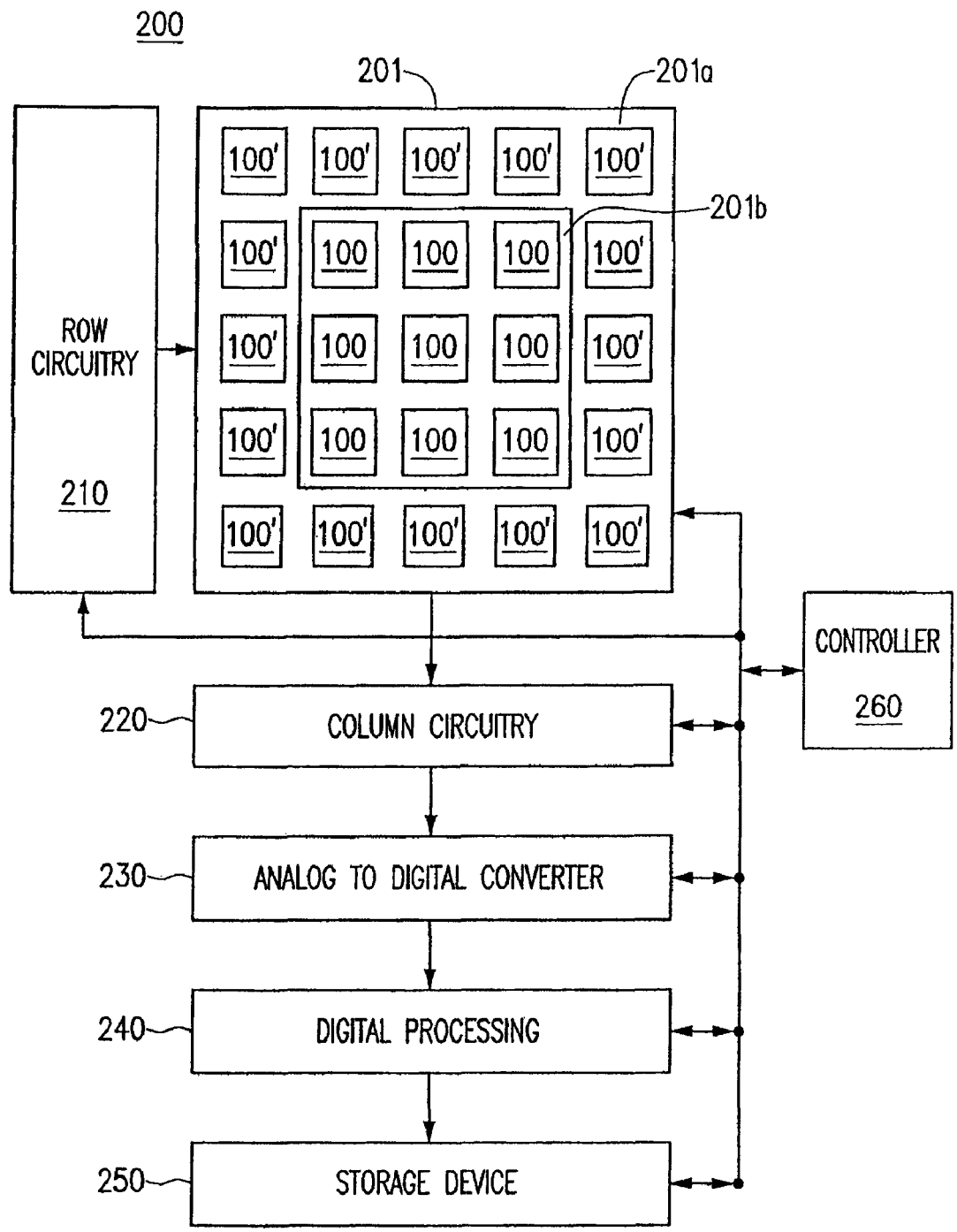
FIG. 2 illustrates an imager utilizing the pixel of FIG. 1.
Figure 3:
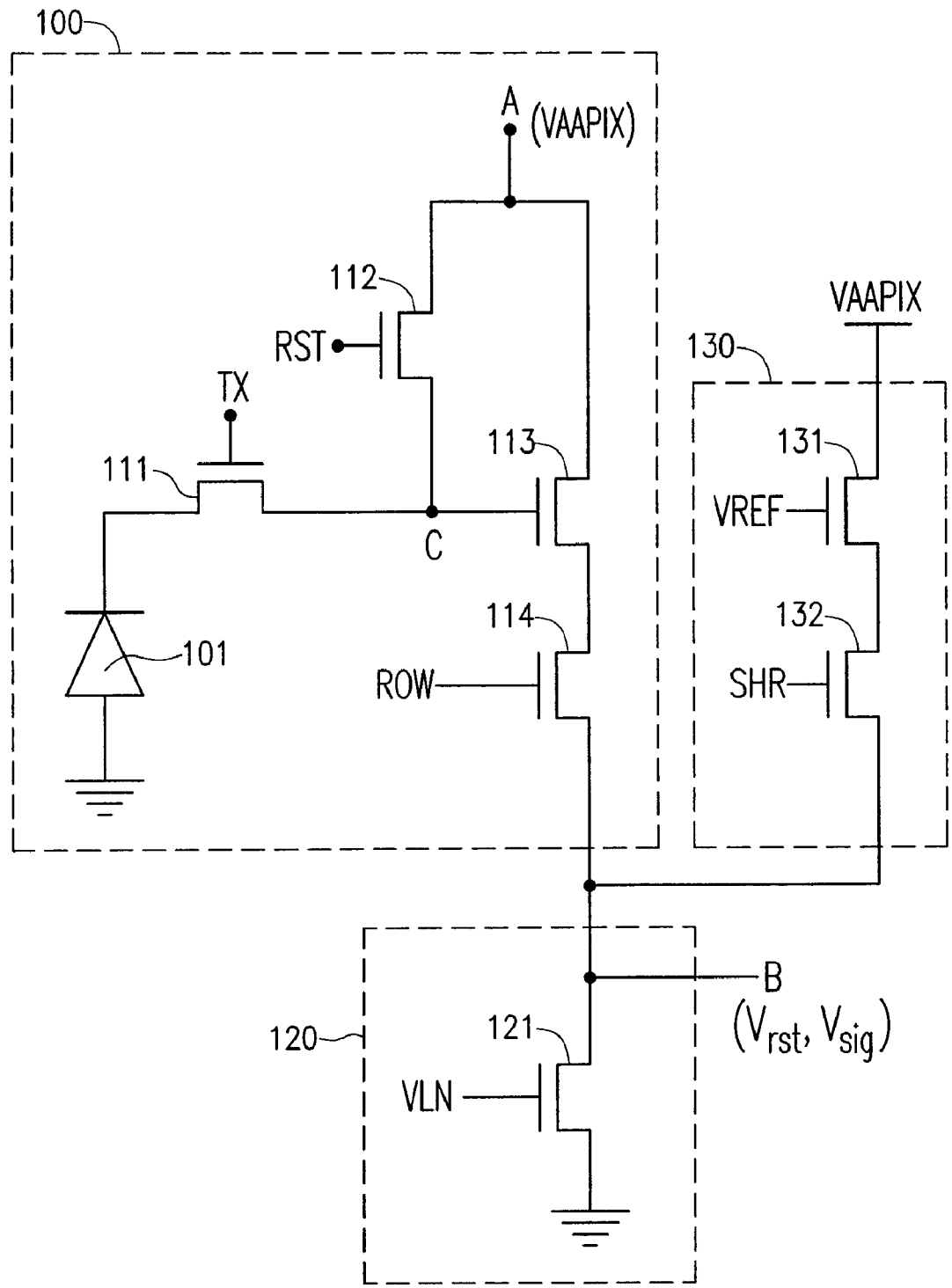
FIG. 3 illustrates a proposed pixel, anti-eclipsing circuit, and load circuit.

The eclipse detection circuit 450 includes a comparator 451 and an AND gate 452. In the illustrated embodiment, the negative input terminal of the comparator 451 is coupled to node B, while the positive input terminal of the comparator 451 is coupled at a node J to an anti-eclipsing reference voltage AE_REF. The output of the comparator 451 is supplied as one input to the AND gate 452. A reset signal sample and hold SHR control signal, which is asserted only when the column circuitry 220 (FIG. 2) is sampling the reset signal Vrst from a pixel 100, is supplied as a second input to the AND gate 452. The output of the AND gate 452 is supplied, at a node K, as the output of the eclipse detection circuit 450. Node K is also coupled to the gate of the switching transistor 413 in the voltage clamping circuit 410. If necessary, a voltage level shifter may be inserted in series between node K and the gate of transistor 413. Additionally, while circuit 450 is illustrated as having an AND gate 452, the invention may be practiced using other logic circuits. For example, AND gate 452 can be replaced with a NAND gate by reversing the polarity of comparator 451 and replacing signal SHR at one input of the AND gate 452 with a complementary signal on the NAND gate.

The eclipse detection circuit 450 operates by comparing the voltage level of a pixel output at node B with the anti-eclipsing voltage AE_REF. The anti-eclipsing voltage AE_REF is preferably set to correspond to a low threshold voltage indicating the onset of an eclipse condition. If the voltage at node B is drops below the AE_REF voltage, the comparator 451 output will be a voltage corresponding to, e.g., a high logical state. If the pixel 100 is outputting the reset signal Vrst, then the SHR signal will also be at a voltage corresponding to the high logical state. Under such conditions, the AND gate 452 will output a voltage corresponding to the high logical state. If the pixel 100 is outputting the reset signal Vrst, but the voltage of the reset signal Vrst is at least equal to the anti-eclipsing voltage AE_REF, the comparator 451 output will be at a voltage corresponding to a low logical state and the output of the AND gate 452 will be also be a voltage corresponding to the low logical state. Alternatively, if the pixel 100 is not outputting the reset signal Vrst, then the SHR signal will be at a voltage corresponding to the low logical state and the AND gate 452 will also output a voltage corresponding to the low logical state.

The output of the AND gate 452 at node K is the output of the eclipse detection circuit 450. As noted above, this output signal is supplied via node K to the gate of the switching transistor 413 of the voltage clamping circuit 410. If the output signal at node K corresponds to a high logical state, the switching transistor 413 conducts. This causes the voltage clamping circuit 410 to pull up the voltage at node B via the switching transistor 413 and the source follower transistor 412. The present invention therefore pulls up the voltage of output of the pixel 100 only when a eclipse condition is detected and the reset voltage Vrst is being sampled.

If the output signal at node K corresponds to a low logical state, the switching transistor 413 is non-conducting. When the switching transistor 413 is non-conducting, any subthreshold conduction current which may flow through the source follower transistor 412 cannot flow through the switching transistor 413 and therefore does not affect the pixel output. In this manner, the present invention prevents subthreshold conduction current of the source follower transistor 412 of the clamping circuit 410 from contributing a noise component to the reset signal Vrst.

Figure 5:
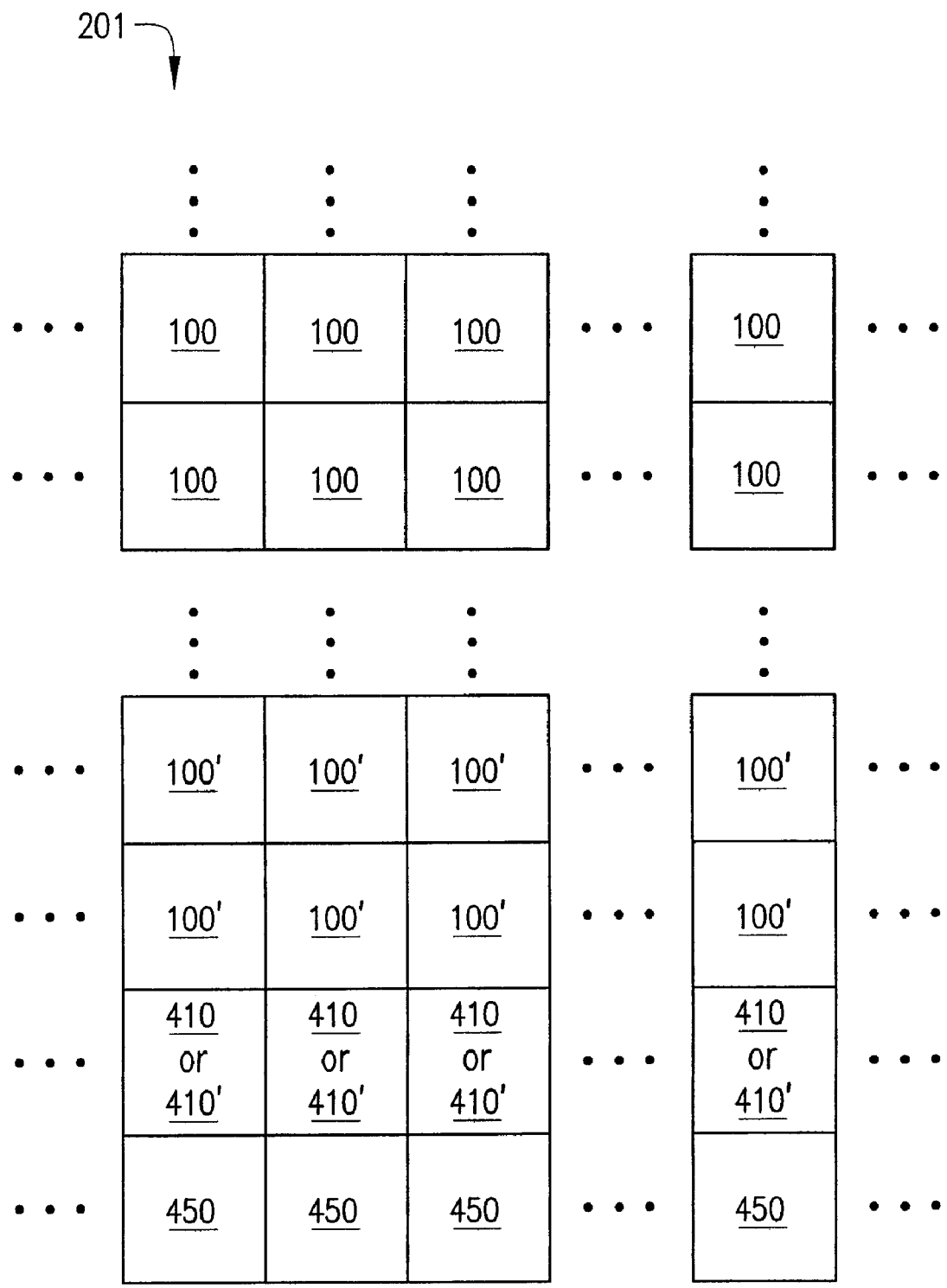
FIG. 5 illustrates an organization of a pixel array consistent with the principles of the present invention.

FIG. 5 illustrates how a pixel array 201 consistent with the principles of the present invention could be organized. As illustrated, the pixel array 201 includes a plurality of image pixels 100 arranged to be in an interior portion of the pixel array 201. A plurality of barrier pixels 100' are located at the periphery of the pixel array 201. As illustrated, the barrier pixels 100' are two deep, however, the amount of barrier pixels 100' can be varied. Beyond the barrier pixels 100' are the voltage clamping circuits 410, and beyond the voltage clamping circuits are the eclipse detecting circuits 450.

Figure 6:
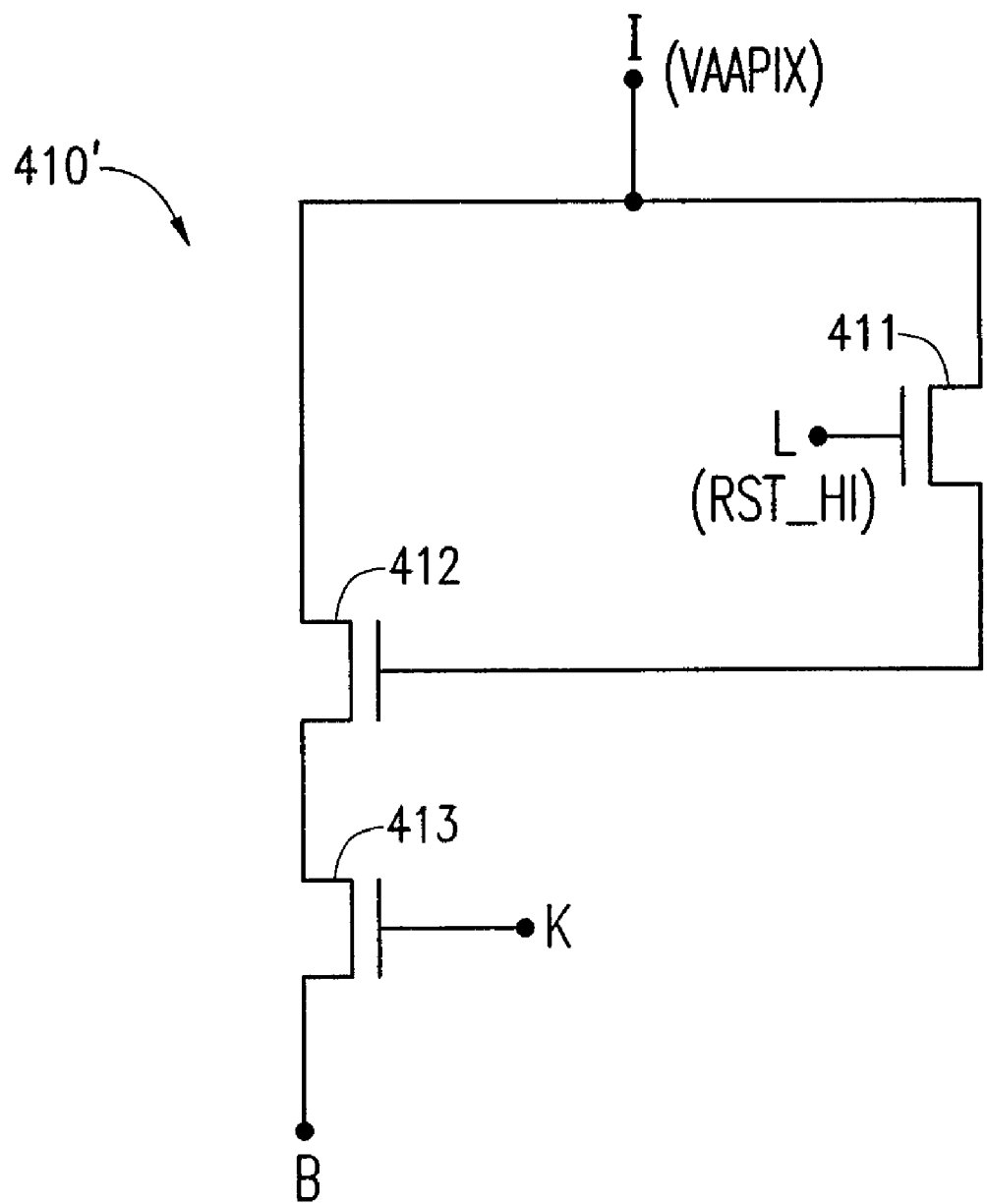
FIG. 6 illustrates an alternate embodiment of a clamping circuit of the present invention.

FIG. 6 illustrates an alternate embodiment voltage clamping circuit 410'. In the embodiment illustrated in FIG. 6, the control transistor 411 is not configured as a diode. Instead, the gate of the control transistor 411 is coupled to a RST_HI control signal via node L. The voltage clamping circuit 410' illustrated in FIG. 6 is intended for use with pixels 100 in which the reset voltage level is controlled to be a different voltage level than the pixel power voltage VAAPIX. In the voltage clamping circuit 410' the RST_HI control signal can be set to the same voltage level as the reset voltage of the floating diffusion node C of the pixel 100 or it can be set to be a higher value. The voltage clamping circuit 410' can be used with the previously described eclipse detection circuit 450.

Figure 7:
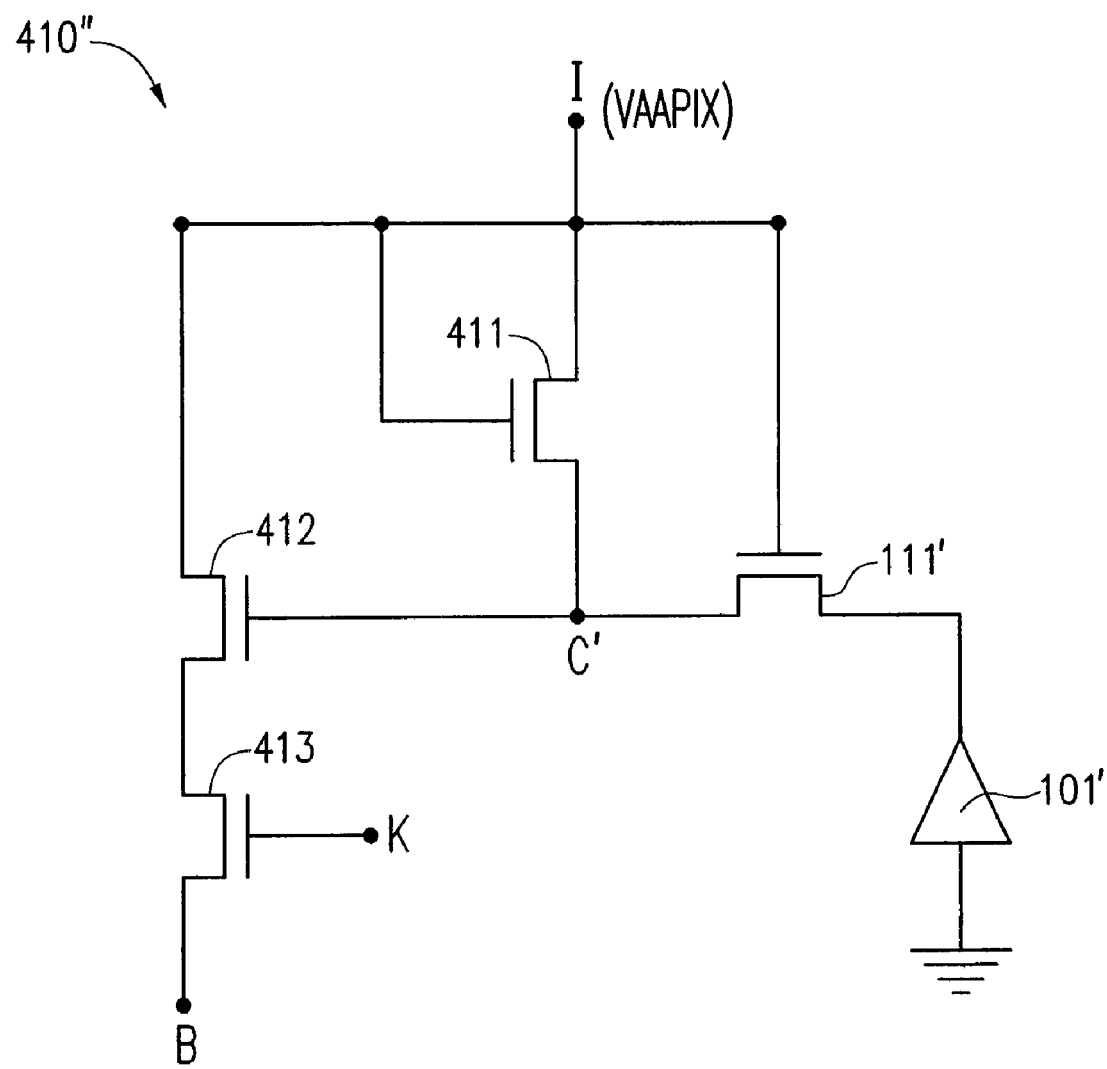
FIG. 7 illustrates another alternate embodiment of a clamping circuit of the present invention.

FIG. 7 illustrates an another embodiment voltage clamping circuit 410". Referring also to FIG. 5, it can be seen that one way of organizing the pixel array 201 is to place the voltage clamping circuit 410 between the barrier pixels 100' and the eclipse detection circuit 450. In the embodiment illustrated by FIG. 7, the barrier pixel, which is arranged to have a similar attribute as the image pixel but photo sensor 101' is masked from an image, has been incorporated into the voltage clamping circuit 410". The voltage clamping circuit 410" includes a control transistor 411, configured to act as a diode and coupled in series between the pixel power VAAPIX at node I and a floating diffusion node C'. Also coupled to the floating diffusion node C' is a transfer transistor 111', which has its gate coupled to node I and is therefore always conducting. A photo sensor 101', which may be a pinned photodiode, is coupled in series to the transfer transistor 111'. The light sensitive element 101' is shielded from incident light so as to always output a dark current. The voltage clamping circuit 410" also includes the previously described source follower transistor 412 and the switching transistor 413 (see FIG. 6). The voltage clamping circuit 410" operates by accepting a control signal, via node K, from the eclipse detection circuit 450 and pulling up the voltage at node B via the switching transistor 413 and source follower transistor 412 when a eclipse condition is detected by the eclipse detection circuit 450 and the reset voltage Vrst is being sampled.

Figure 8:
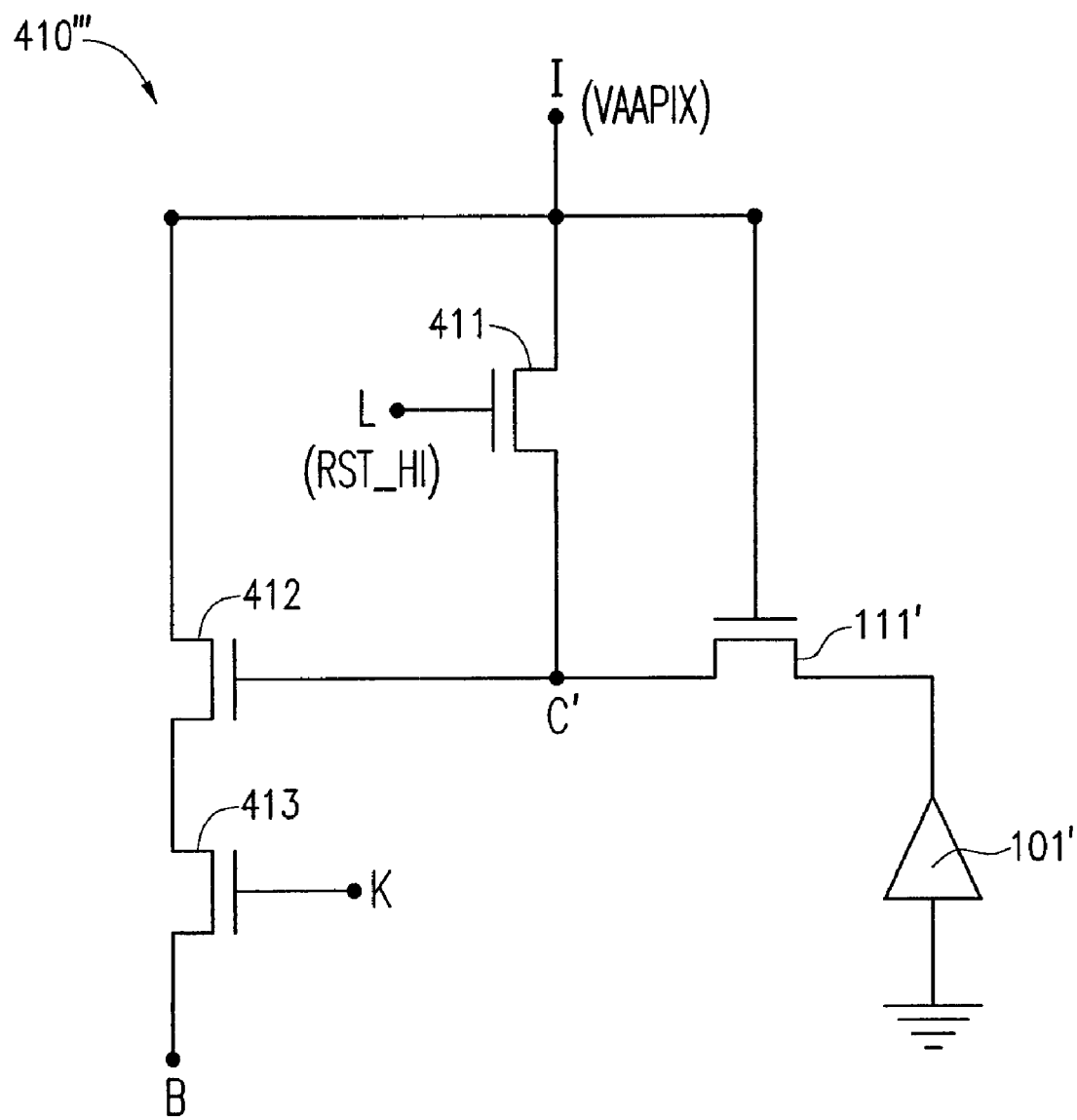
FIG. 8 illustrates yet another alternate embodiment of a clamping circuit of the present invention.

FIG. 8 illustrates an another embodiment voltage clamping circuit 410'''. The circuit of FIG. 8 differs from the circuit of FIG. 7 by having a different configuration for the control transistor 411. In FIG. 8, the control transistor 411 is not configured to act as a diode, instead the gate of the transistor 411 is coupled to a RST_HI signal at node L. Similar to the circuit 410' illustrated in FIG. 6, the voltage clamping circuit 410''' of the illustrated embodiment is intended for use with pixels 100 in which the reset voltage level is controlled to be a different voltage level than the pixel power voltage VAAPIX.

Referring back to FIG. 5, the voltage clamping circuits 410" or 410''' can be used in a pixel array 201 as a substitute for a row of barrier pixels 100'. The use of circuit 410" or 410''' eliminates the need for using circuits 410 or 410'. Accordingly, when either circuits 410" or 410''' are used to replace a row of barrier pixels 100', the eclipse detection circuits 450 can be placed adjacent to circuits 410" or 410'''.

The present invention therefore minimizes the affect of noise introduced by an anti-eclipsing circuit by electrically coupling the voltage clamping circuit of the anti-eclipsing circuit to the output of a pixel only when conditions likely to cause a eclipse is detected. By decoupling the voltage clamping circuit when an eclipse is not likely to occur, subthreshold conduction current associated with a source follower transistor of the voltage clamping circuit is not introduced as noise into the pixel output signal.

It should be evident those skilled in the art that the above described circuits and methods may also be modified to correct or limit the voltage level of the photo signal Vsig. For example, the eclipse detection circuit 450 (FIG. 4) may be adapted to act when the column circuit 220 (FIG. 2) is sampling the photo signal Vsig by substituting a signal SHS, which is asserted at a voltage corresponding to a logical high only when the column circuit 220 is sampling the photo signal, in place of the signal SHR. Additionally, the eclipse detection circuit 450 may be modified to detection other conditions. For example, the voltage level at node J can be varied to correspond to threshold voltages for other detectable conditions. Additionally, the inputs of the comparator 451 can be wired in reverse orientation to cause the comparator to detect an over voltage condition. Similarly, the voltage clamping circuits 410, 410', 410", 410''' can be operated by applying a different power signal at node I, or, in circuits 410' and 410''', by varying the voltage level of RST_HIGH.

Figure 9:
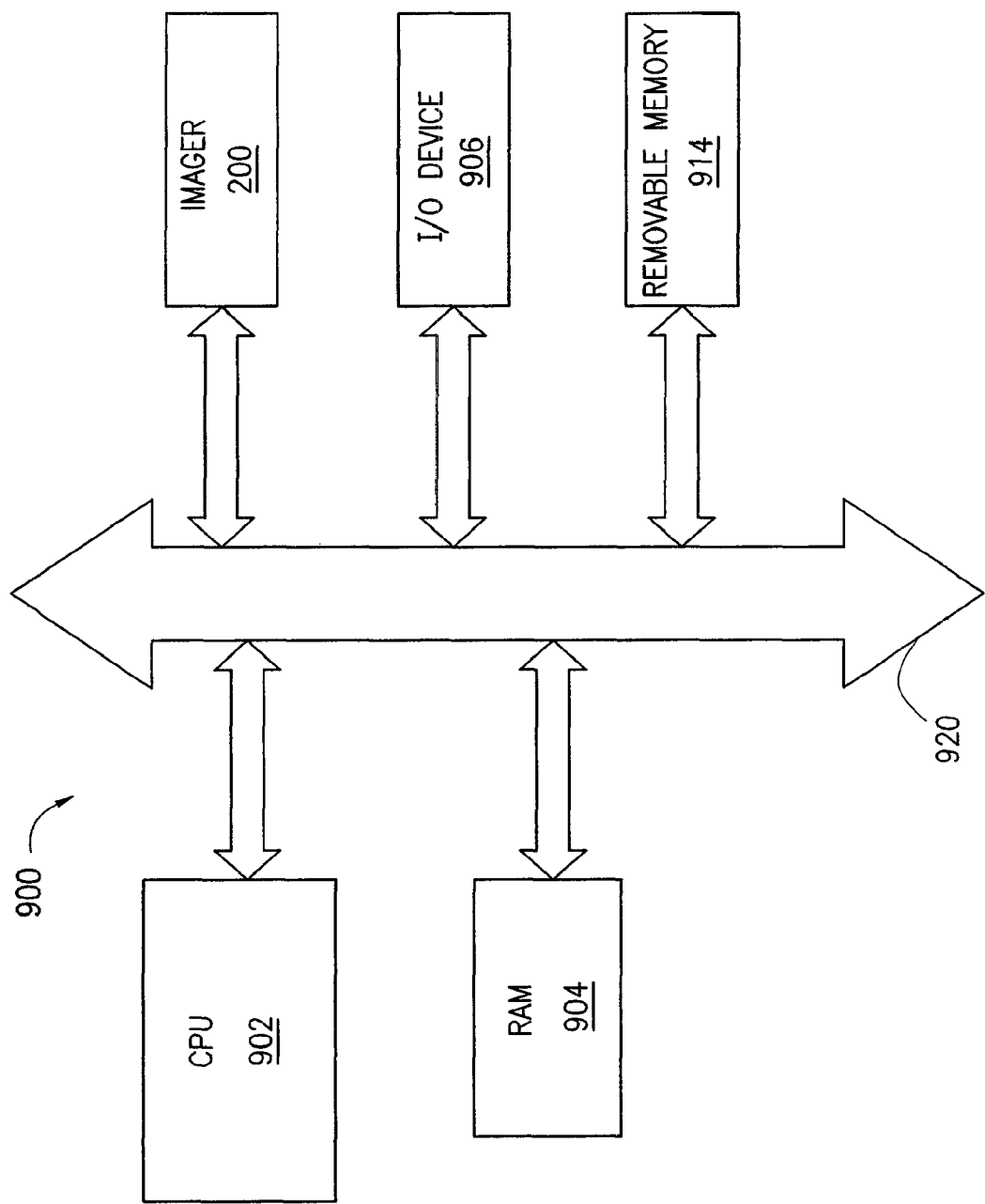
FIG. 9 illustrates a processing system incorporating the anti-eclipsing circuit of the present invention.

FIG. 9 shows system 900, a typical processor system modified to include an imager 200 with the pixel array 201 (FIG. 5) of the present invention. The system 900 is exemplary of a system having digital circuits that could include image sensor devices. Without being limiting, such a system could include a computer system, camera system, scanner, machine vision, vehicle navigation, video phone, surveillance system, auto focus system, star tracker system, motion detection system, image stabilization system, and data compression system.

System 900, for example a camera system, generally comprises a central processing unit (CPU) 902, such as a microprocessor, that communicates with an input/output (I/O) device 906 over a bus 920. Imaging device 200 also communicates with the CPU 902 over the bus 920. The system 900 also includes random access memory (RAM) 904, and can include removable memory 914, such as flash memory, which also communicate with the CPU 902 over the bus 920. The imager 200 may be combined with a processor, such as a CPU, digital signal processor, or microprocessor, with or without memory storage on a single integrated circuit or on a different chip than the processor.

It should be appreciated that other embodiments of the invention include a method of manufacturing the circuit 400 of the invention as illustrated in FIG. 4. For example, in one exemplary embodiment, a method of manufacturing an anti-eclipse circuit includes the steps of providing a voltage clamping circuit 410 and an eclipse detection circuit 450. Variations upon the method may include providing one of the alternate circuits 410', 410", and 410''' in lieu of providing circuit 410. In addition, the circuit 400 of FIG. 4 can be fabricated as part of an integrated circuit fabrication method using known fabrication techniques.

While the invention has been described in detail in connection with the exemplary embodiments, it should be understood that the invention is not limited to the above disclosed embodiments. Rather, the invention can be modified to incor-

What is claimed as new desired to be protected by Letters Patent of the United States is:

1. A correction circuit for an image pixel, comprising:
   a signal circuit comprising a power source, a source follower transistor coupled to said power source and outputting a correction signal, at least one control transistor configured to control a level of said correction signal, and a switch for controllably supplying said correction signal to an output of said pixel; and
   a detection circuit for detecting a low voltage condition in a reset signal component of said output of said pixel and for controlling said switch to cause said switch to supply said correction signal to said output of said pixel only when said low voltage condition is detected by said detection circuit.

2. The circuit of claim 1, wherein said detection circuit comprises: a comparator having a first input coupled to said output of said pixel and a second input coupled to a reference voltage.

3. The circuit of claim 2, wherein said comparator outputs a first control signal in a first state when a voltage of said reset signal is less than said reference voltage.

4. The correction circuit of claim 1, wherein said at least one control transistor comprises a transistor having a first source/drain and a gate connected to said power source, and a second source/drain connected to said source follower transistor.

5. The correction circuit of claim 1, wherein said at least one control transistor comprises a transistor having a first source/drain connected to said power source, a gate connected to receive a control signal, and a second source/drain connected to said source follower transistor.

6. The correction circuit of claim 5, wherein said control signal is set to a voltage level corresponding to a voltage level of a floating diffusion node of said image pixel.

7. A correction circuit for an image pixel, comprising:
   a signal circuit comprising a signal generator for generating a correction signal, and a switch for controllably supplying said correction signal to an output of said pixel; and
   a detection circuit for detecting a low voltage condition in a reset signal component of said output of said pixel and for controlling said switch to cause said switch to supply said correction signal to said output of said pixel only when said low voltage condition is detected by said detection circuit,
   wherein said detection circuit comprises:
     a comparator having a first input coupled to said output of said pixel and a second input coupled to a reference voltage, said comparator outputting a first control signal; and
     a logic gate having one input accepting said first control signal and another input accepting a second control signal, wherein said logic gate outputs a third control signal for controlling a state of said switch.

8. A pixel array, comprising:
   a plurality of pixels, said plurality of pixels comprising a plurality of imaging pixels which image and a plurality of barrier pixels which do not image, said plurality of pixels arranged into a plurality of rows;
   a plurality of signal circuits, each signal circuit comprising:
     a power source;
     a source follower transistor coupled to said power source and outputting a correction signal;
     a control transistor configured to control a level of said correction signal; and
     a switch for controllably supplying said correction signal to an output of one of said imaging pixels; and
   a plurality of detection circuits for detecting a low voltage condition in a reset signal component of an output of a respective one of said imaging pixels and for controlling a respective one of said switches to supply a respective correction signal to said respective output only when said low voltage condition is detected.

9. The pixel array of claim 8, wherein each detection circuit comprises: a comparator having a first input coupled to said output of said respective imaging pixel and a second input coupled to a reference voltage.

10. The pixel array of claim 9, wherein said comparator outputs a first control signal in a first state when a voltage of said reset signal is less than said reference voltage.

11. The pixel array of claim 8, wherein said plurality of signal circuits are arranged within said pixel array between said plurality of detection circuits and said plurality of barrier pixels.

12. The pixel array of claim 8, wherein at least a portion of said plurality of barrier pixels is incorporated into said plurality of signal circuits.

13. The pixel array of claim 12, wherein each of said barrier pixels comprises:
   a non-imaging photosensor; and
   a transfer transistor having a source coupled to said non-imaging photosensor and a drain coupled to a floating diffusion node.

14. The pixel array of claim 13, wherein said at least one control transistor comprises a transistor having a first source/drain and a gate connected to said power source, and a second source/drain connected to said floating diffusion node.

15. The pixel array of claim 13, wherein said at least one control transistor comprises a transistor having a first source/drain connected to said power source, a gate connected to receive a control signal, and a second source/drain connected to said floating diffusion node.

16. A pixel array, comprising:
   a plurality of pixels, said plurality of pixels comprising a plurality of imaging pixels which image and a plurality of barrier pixels which do not image, said plurality of pixels arranged into a plurality of rows;
   a plurality of signal circuits, each signal circuit comprising:
     a respective signal generator for generating a respective correction signal, and a respective switch for controllably supplying said respective correction signal to a respective output of one of said imaging pixels; and
   a plurality of detection circuits each for detecting a low voltage condition in a reset signal component of an output of a respective one of said imaging pixels and for controlling a respective one of said switches to cause said respective switch to supply a respective correction signal to said respective output of one of said imaging pixels only when said low voltage condition is detected by one of said detection circuits,
   wherein each detection circuit comprises:
     a comparator having a first input coupled to said output and a second input coupled to a reference voltage, wherein said comparator outputs a first control signal in a first state when a voltage of said reset signal is less than said reference voltage, and a logic gate having one input accepting said first control signal and another input accepting a second control signal, wherein said logic gate outputs a third control signal for controlling a state of said switch in said signal circuit.

17. The pixel array of claim 16, wherein said plurality of signal circuits are arranged within said pixel array between said plurality of detection circuits and said plurality of barrier pixels.

18. An imaging device, comprising:
a plurality of pixels, said plurality of pixels comprising a plurality of imaging pixels which image and a plurality of barrier pixels which do not image, said plurality of pixels arranged into a plurality of rows;
a plurality of signal circuits, each signal circuit comprising:
a signal generator for generating a correction signal, wherein a respective barrier pixel of said plurality of barrier pixels is incorporated into said signal generator; and
a switch for controllably supplying said correction signal to an output of one of said imaging pixels; and
a plurality of detection circuits for detecting a low voltage condition in a reset signal component of an output of a respective one of said imaging pixels and for controlling a respective one of said switches to supply a respective correction signal to said respective output only when said low voltage condition is detected;
an image processing circuit, coupled to, and for receiving outputs from, said imaging pixels and said signal circuits, to produce a digital output; and
a storage device, coupled to said image processing circuit, for receiving and storing said digital output.

19. The imaging device of claim 18, wherein each detection circuit comprises: a comparator having a first input coupled to said output of said respective imaging pixel and a second input coupled to a reference voltage.

20. The imaging device of claim 19, wherein said comparator outputs a first control signal in a first state when a voltage of said reset signal is less than said reference voltage.

21. The imaging device of claim 18, wherein each of said barrier pixels comprises:
a non-imaging photosensor that is masked from direct light; and
a transfer transistor having a source coupled to said non-imaging photosensor and a drain coupled to a floating diffusion node.

22. An imaging device, comprising:
a plurality of pixels, said plurality of pixels comprising a plurality of imaging pixels which image and a plurality of barrier pixels which do not image, said plurality of pixels arranged into a plurality of rows;
a plurality of signal circuits, each signal circuit comprising:
a respective signal generator for generating a respective correction signal; and a respective switch for controllably supplying said respective correction signal to a respective output of one of said imaging pixels;
a plurality of detection circuits each for detecting a low voltage condition in a reset signal component of an output of a respective one of said imaging pixels and for controlling a respective one of said switches to cause said respective switch to supply a respective correction signal to said respective output of one of said imaging pixels only when said low voltage condition is detected by one of said detection circuits;
an image processing circuit, coupled to, and for receiving outputs from, said imaging pixels and said signal circuits, to produce a digital output; and
a storage device, coupled to said image processing circuit, for receiving and storing said digital output,
wherein each detection circuit comprises: a comparator having a first input coupled to said output of said respective imaging pixel and a second input coupled to a reference voltage, wherein said comparator outputs a first control signal in a first state when a voltage of said reset signal is less than said reference voltage; and a logic gate having one input accepting said first control signal and another input accepting a second control signal, wherein said logic gate outputs a third control signal for controlling a state of said switch in said signal circuit.

23. A processing system, comprising:
a processor;
an imaging device coupled to said processor, said imaging device comprising:
a pixel array, said pixel array comprising:
a plurality of pixels, said plurality of pixels comprising a plurality of imaging pixels which image and a plurality of barrier pixels which do not image, said plurality of pixels arranged into a plurality of rows;
a plurality of signal circuits, each signal circuit comprising:
a power source;
a source follower transistor coupled to said power source and outputting a correction signal;
a control transistor configured to control a level of said correction signal; and
a switch for controllably supplying said correction signal to an output of one of said imaging pixels;
a plurality of detection circuits for detecting a low voltage condition in a reset signal component of an output of a respective one of said imaging pixels and for controlling a respective one of said switches to supply a respective correction signal to said respective output only when said low voltage condition is detected;
an image processing circuit, coupled to, and for receiving outputs from, said imaging pixels and said signal circuits, to produce a digital output; and
a storage device, coupled to said image processing circuit, for receiving and storing said digital output.

* * * * *